UNITED STATES PATENT OFFICE.

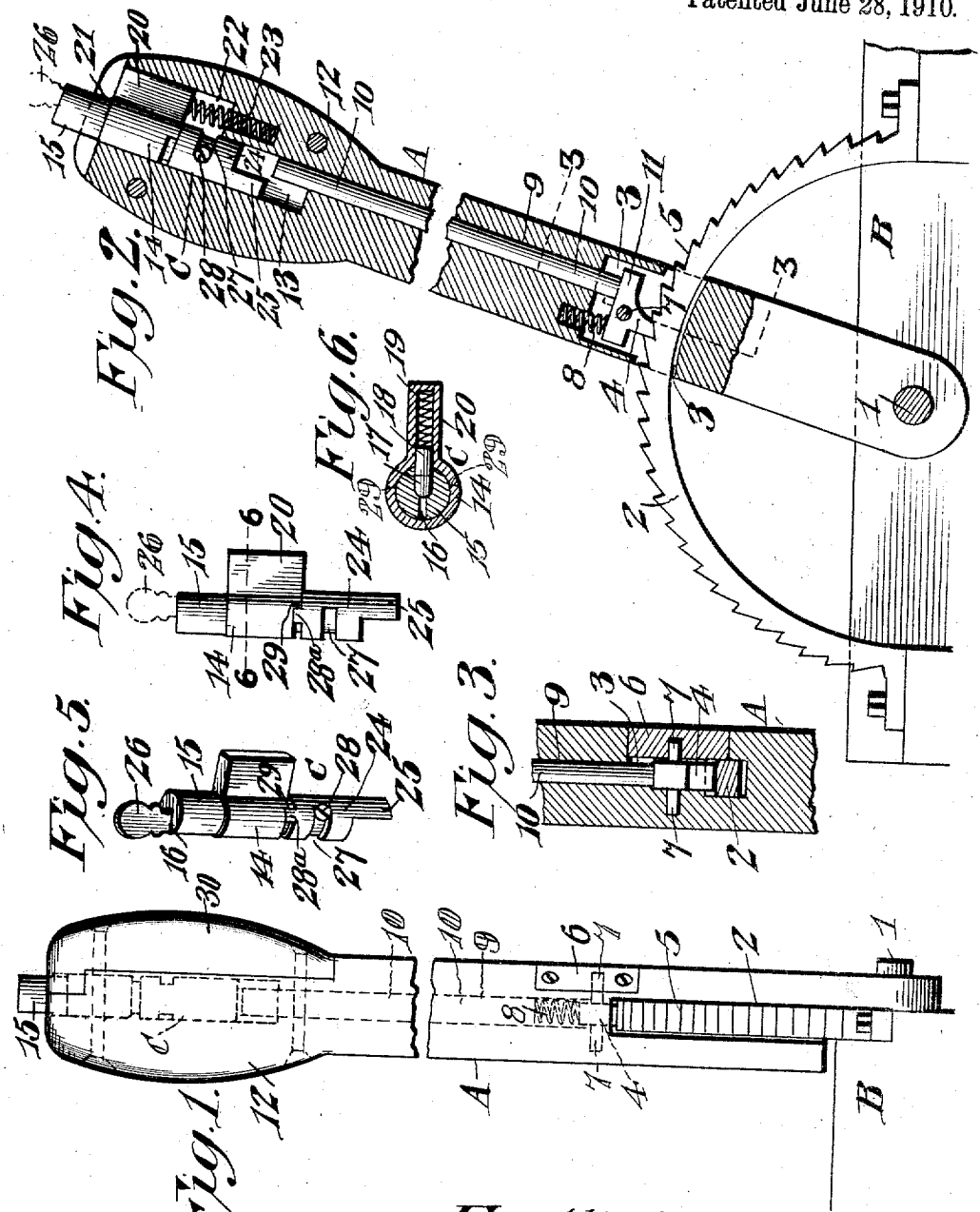

FRANKLIN C. MILLER, OF EASTON, PENNSYLVANIA.

AUTOMOBILE-CONTROLLER LEVER-LOCK.

962,448.  Specification of Letters Patent.  Patented June 28, 1910.

Application filed April 26, 1909. Serial No. 492,189.

*To all whom it may concern:*

Be it known that I, FRANKLIN C. MILLER, a citizen of the United States, residing at Easton, in the county of Northampton and State of Pennsylvania, have invented a new and useful Automobile - Controller Lever-Lock, of which the following is a specification.

This invention relates to a controller for an automobile such, for instance, as a lever having a latch and toothed sector device for holding the lever in different operating positions.

The present invention has for its principal objects the provision of a locking means combined with the latch device of the controller, so that the latter can be locked in inoperative position to enable the owner of the automobile to leave the same with perfect safety as respects the car being taken by a thief or unauthorized person, or the car started by mischievous persons, or otherwise, the lock being of such a nature as to be opened and closed only by a key which the owner alone possesses.

Another object of the invention is the provision of a combined lock and push button associated with the controller in such a manner that the push button can be used in normal operation in shifting the controller in the operation of the automobile, but which can be thrown to inoperative position when it is desired to lock the controller out of use.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a front view of a controlling lever equipped with the improved locking device, with an intermediate portion broken away. Fig. 2 is a longitudinal section of the lever showing the same in locked position. Fig. 3 is a transverse section on line 3—3, Fig. 2. Fig. 4 is a side view of the combined lock and push button removed and showing the bolt thereof in normal position. Fig. 5 is a perspective view of the combined push button and lock. Fig. 6 is a transverse section on line 6—6, Fig. 4.
Similar reference characters are employed to designate corresponding parts throughout the views.

Referring to the drawing, A designates the controller, shown in the present instance as a lever, and which may be used in connection with the clutch, emergency brake, change speed gear, or as a combined controlling lever for the clutch and emergency brake. This lever is connected with the rock shaft 1, attached in any suitable manner with the mechanism to be controlled and associated with the lever is a toothed sector 2 that extends through a chamber 3 in the lever which is open at its opposite sides for the sector to pass. The sector is mounted on a fixed part of the vehicle frame, a portion of which is designated by B, and the lever is adapted to move back and forth along the sector, the center of curvature of which is coincident with the rock shaft 1.

In the chamber 3 of the lever is the spring-pressed latch or dog 4 which coöperates with the teeth 5 of the sector 2 to hold the lever in set position. The chamber 3 is closed at one side by a plate 6 riveted or otherwise suitably secured in place, and this plate coöperates with the inner wall of the chamber to support the pin 7 that forms the axle on which the latch 4 tilts. Arranged in the chamber is a spring 8 which urges the latch 4 into engagement with the toothed sector. Extending longitudinally of the lever is a passage 9 in which is mounted a reciprocatory latch-releasing push-rod 10, the inner end of which extends into the chamber 3 and engages the projecting arm 11 of the latch 4. The push-rod 10 extends upwardly to the handle 12 of the operating lever and is disposed in coöperative relation with a push-button so that the operator can release the latch at will.

The push-button, in the present instance, is of special construction, as it combines with its function of an actuator for the push-rod, the further function of a lock, whereby the operating lever can be locked in any desired position. In the present instance, the combined push-button and lock, designated generally by C, is in the nature of a tumbler lock mounted in the handle in such a manner as to have bodily movement so as to function as a push-button. The handle 12 is provided with a longitudinally-extending chamber 13 to receive the device C. The combined push-button and lock comprises a barrel or casing 14 in which is rotatably mounted the cylinder 15 which, as shown in Fig. 6, has a keyhole or slot 16 for the reception of a key for operating the coacting tumbler pins 17 and 18, the latter of which is pressed by a spring 19 housed in an offset chamber 20 of the casing or barrel 14. The cylinder projects upwardly from the casing 14 and extends out of the upper end of the handle 12 through an opening 21 so that the end of the cylinder can be engaged by the thumb of the hand gripping the lever and be pressed when it is desired to release the holding latch 4. The chambered portion 20 of the casing is disposed in an offset recess 22 of the chamber 13 in the handle 12, and bearing against the portion 20 is a spring 23 which yieldingly holds the device C, with the cylinder 15, projected from the handle, as shown in Fig. 2. The inner end of the cylinder projects beyond the casing 14 and carries a bolt 24 which is provided with an extension 25 that normally alines with the push-rod 10 so that the inward movement of the device C will release the catch 4. The cylinder is adapted to make one complete rotation so that the key 26 can be inserted to operate the lock, and removed after the latter is in locking position. The bolt, however, is intended to turn through one hundred and eighty degrees to be thrown out of alinement with the push-rod 10, so that movement of the device C will not be imparted to the said push-rod. For this purpose, the bolt 24, which is in the form of a sleeve rotatably mounted on the inner end of the cylinder 15, has an approximately semicircular slot 27 into which extends a stop 28 in the form of a screw secured to the cylinder, and the inner end of the sleeve 24 is provided with a projection 28ª which is adapted to engage approximately diametrically-disposed shoulders 29, one of which is shown in Fig. 4, so that the sleeve or bolt 24 can make half a rotation. The slot 27 and pin 28 constitute a lost motion connection between the cylinder 15 and bolt 24.

When the parts are in the position shown in Fig. 2, the controller is locked out of use, so that the emergency brake will be set, the clutch open, the change speed gear thrown out, according to either of which the lever is intended to control. It will thus be seen that no one except the possessor of the key can unlock the lever. When the owner wishes to run the automobile, it is merely necessary to unlock the lever, and to do this, the key 26 is inserted and the cylinder given one complete turn. This will throw the projection 25 of the bolt from the position shown in Fig. 2 to that shown in Fig. 4, so that the bolt and push-rod will be operatively related. The device can then be pushed inwardly to thereby release the latch, which latter cannot be released when the bolt is in the position shown in Fig. 2. In throwing the bolt into and out of coöperative relation with the push-rod 10, the key is inserted in the cylinder, as shown in Fig. 5, and during the first half turn, the pin 28 passes to the opposite end of the slot 27, so that the parts will be in the position shown in Fig. 4, and then during the second half turn the bolt 24 will be turned with the cylinder to throw it to the position shown in Fig. 2. The device C can be then pushed inwardly without having any effect on the latch device, which holds the lever locked. When the device C is pushed inwardly, the spring 22 will return it to normal position, and the spring 8 serves to return the latch 11 to locking position after it has been actuated to released position to permit movement of the controlling lever. In order to assemble the parts in the handle, the latter may be in two parts, as shown in Fig. 1, one of the parts being a removable plate 30 riveted or otherwise fastened to the rest of the handle. The keys 26 can be made in a great variety of shapes, so that no two keys will ever fit the locks of any two automobiles, and nobody but the owner or one authorized by him can unlock the controller of the automobile and start the same.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. An automobile attachment comprising a controller, means for holding the controller in different operating positions, and a key-controlled device permanently carried by and projecting from the controller and adapted to be thrown into and out of coöperative relation with the said holding means.

2. The combination of a controller, a holding means therefor, an actuator for the holding means, a key-controlled device for throwing the actuator into and out of coöperative relation with the holding means.

3. The combination of a controller, means for holding the controller in different operative positions, a push-button for releasing the holding means, and a key-operated device for throwing the push-button into and out of coöperative relation with the holding means.

4. The combination of a controller, means for holding the controller in different operative positions, said means including a movable element, a rotatable and depressible push-button on the controller and permanently attached thereto for moving the said element, and a lock device for turning the push button and holding the latter in operative or inoperative position with respect to the said element.

5. The combination of a controlling lever, a toothed member associated therewith, a latch element carried by the lever to engage the said member, an operating device carried by the lever for operating the latch, and a rotatable and longitudinally-movable actuating member attached to and normally protruding from the lever and movable by means of a turn key into and out of coöperative relation with the said device.

6. The combination of a controlling lever, a toothed member associated therewith, a latch mounted on the lever at a point outwardly from the member to engage the latter, an actuating element located between the latch and outer end of the lever for moving the latch, a push-button permanently carried by the lever at the outer end thereof, and a locking device for holding the push-button in operative or inoperative position with respect to the element.

7. The combination of a lever having a chamber open at opposite sides, a fixed curved member extending through the chamber and having teeth on its convex side, a latch pivoted in the chamber for engaging the toothed member, an actuating rod mounted in the lever to engage the latch for tilting the same, an actuator movable into and out of coöperative relation with the rod, and a locking device for controlling the position of the actuator.

8. The combination of a controller, a holding device therefor including a reciprocatory member, an actuator reciprocating in alinement with the member, and a locking device for moving the actuator into or out of coöperative relation with the member.

9. The combination of a controller, holding means therefor including a reciprocatory rod housed in the controller, a push element disposed in alinement with the rod to actuate the same, a key-controlled means for turning the push element into or out of coöperative relation with the rod.

10. The combination of a controller, a holding means therefor including an operating rod housed in the controller, a push-button for actuating the rod, a member carried by the push-button and disposed between the latter and rod, and means for moving the member to operatively relate the push-button to the rod.

11. The combination of a controller, a holding means therefor including a spring-pressed element and a releasing member therefor, a push-button on the controller, a device disposed between the push button and member for operatively relating the two, and a key-controlled means for throwing the device into and out of coöperative relation with the push-button and member.

12. The combination of a controller, a holding means therefor, and a combined locking device and actuator carried by the controller and movable as a unit for operating the said means and including a rotatable key-actuated element movable into and out of coöperative relation with the said means.

13. The combination of a controller, a pivoted holding means therefor, a combined locking device and actuator permanently carried by the controller and movable back and forth in the controller for operating the holding means and locked by a turning movement in either operative or inoperative position with relation to the said means, and means for yieldingly holding the said device normally projecting from the controller.

14. The combination of a controller having a chambered handle, a holding means for the controller, and a combined actuating and locking device arranged in the said chamber for controlling the holding means, a portion of the said device projecting out of the chamber to form a push-button and having a hole for receiving a key to move the device into and out of coöperative relation with the holding means.

15. The combination of a controller having a chambered handle, a spring actuated holding means for the controller, a combined actuating and key-released locking device arranged in the said chamber for controlling the holding means, a portion of the said device projecting out of the chamber and permanently attached to the portion within the chamber to form a push-button, and a spring for holding the push-button projected from the chamber.

16. The combination of a controller having a chambered handle, holding means for the controller, a device arranged in the chamber for actuating the holding means, said device comprising a member projecting out of the chamber to form a push-button, a key-released means for locking the member in different positions, and a bolt carried by the member and movable thereby into and out of coöperative relation with the holding means.

17. The combination of a controller having a chambered handle, holding means for the controller, a device arranged in the chamber for actuating the holding means, said device comprising a member projecting out of the chamber to form a push-button, a bolt carried by the member and movable thereby into and out of coöperative relation with the holding means, and key-released means for controlling the movement of the said member to throw the bolt into and out of operative position.

18. The combination of a controller, a holding means therefor, a device for operating the holding means, said device comprising a movable casing, a cylinder therein forming a push-button, key-released tumbler pins in the casing and cylinder for controlling the turning of the latter, and means carried by the cylinder to be thrown thereby into and out of coöperative relation with the said holding means.

19. The combination of a controller, a holding means therefor, and a combined actuating and locking device for the holding means, said locking device comprising a rotary member, key-released means for controlling the member, and a bolt on the member carried thereby during a portion of the rotary movement for throwing the bolt into and out of coöperative relation with the holding means.

20. The combination of a controller, a holding means therefor, and a combined actuating and locking device for the holding means, said locking device comprising a rotary member, key-released means for controlling the member, a bolt on the member carried thereby during a portion of the rotary movement for throwing the bolt into and out of coöperative relation with the holding means, said device being bodily movable for actuating the holding means, and a spring for returning the device to normal position.

21. The combination of a controller, a holding means therefor, a combined locking and actuating device for the holding means, said device being mounted in the controller and movable to actuate the holding means, said device comprising a movable casing, a cylinder rotatably mounted therein and movable with the casing, key-released means for preventing turning of the cylinder in the casing, a bolt rotatably mounted on the cylinder, and a lost-motion connection between the bolt and cylinder to permit the latter to make a complete turn while the bolt is given a partial turn for throwing the latter into and out of coöperative relation with the holding means.

22. The combination of a controller, a holding means therefor, a combined locking and actuating device for the holding means, said device being mounted in the controller and movable to actuate the holding means, said device comprising a casing, a cylinder rotatably mounted therein and projecting from both ends of the casing, one end of the cylinder forming a push-button, and a bolt operatively related to the cylinder and movable into and out of coöperative relation to the holding means.

23. The combination of a controller, a holding means therefor, a combined locking and actuating device for the holding means, said device being mounted in the controller and movable to actuate the holding means, said device comprising a casing, a cylinder arranged in the casing with its ends projecting therefrom and one end forming a push-button, a bolt in the form of a sleeve on the other end of the cylinder, a lost-motion connection between the cylinder and bolt, said cylinder and bolt being movable longitudinally to operate the holding means, and a key-released means for controlling the turning of the cylinder in the casing.

In testimony, that I claim the foregoing as my own, I have hereto affixed my signature in the presence of two witnesses.

FRANKLIN C. MILLER.

Witnesses:
REUBEN KOLB,
RUSSELL D. WELCH.